US012752352B2

(12) United States Patent
Ramun

(10) Patent No.: US 12,752,352 B2
(45) Date of Patent: Oct. 6, 2026

(54) SHEAR JAW APEX BLADES

(71) Applicant: Michael Richard Ramun, Mineral Ridge, OH (US)

(72) Inventor: Michael Richard Ramun, Mineral Ridge, OH (US)

( * ) Notice: Subject to any disclaimer, the term of this patent is extended or adjusted under 35 U.S.C. 154(b) by 180 days.

(21) Appl. No.: 18/524,754

(22) Filed: Nov. 30, 2023

(65) Prior Publication Data

US 2025/0178104 A1 Jun. 5, 2025

(51) Int. Cl.
*B23D 35/00* (2006.01)
*B23D 17/00* (2006.01)

(52) U.S. Cl.
CPC ........... *B23D 35/001* (2013.01); *B23D 17/00* (2013.01); *B23D 35/002* (2013.01)

(58) Field of Classification Search
CPC ........ B23D 17/00; B23D 17/04; B23D 17/06; B23D 17/08; B23D 15/02; B23D 15/04; B23D 15/06; B23D 35/00; B23D 35/001; B23D 35/002; E02F 9/2808
See application file for complete search history.

(56) References Cited

U.S. PATENT DOCUMENTS

| | | | | | |
|---|---|---|---|---|---|
| 5,060,378 | A | 10/1991 | LaBounty et al. | | |
| 5,749,146 | A * | 5/1998 | Morikawa | ............ | B23D 35/001 83/928 |
| 6,926,217 | B1 | 8/2005 | LaBounty et al. | | |
| 7,284,718 | B2 | 10/2007 | Christenson | | |
| 7,895,755 | B2 | 3/2011 | Jacobson et al. | | |
| 8,646,709 | B2 * | 2/2014 | Ramun | ................... | E02F 3/965 241/266 |
| 10,252,356 | B2 * | 4/2019 | Jacobson | ............. | B23D 35/001 |
| 10,322,413 | B2 | 6/2019 | Raihala | | |
| 2014/0331843 | A1 * | 11/2014 | Hall | ........................ | E02F 3/965 83/694 |
| 2015/0225925 | A1 | 8/2015 | Jacobson et al. | | |
| 2020/0086326 | A1 * | 3/2020 | Johnson | .................. | E02F 3/965 |
| 2022/0297207 | A1 | 9/2022 | Jacobson et al. | | |

FOREIGN PATENT DOCUMENTS

CN 111112731 A * 5/2020 ........... B23D 35/001

* cited by examiner

*Primary Examiner* — Jennifer S Matthews
(74) *Attorney, Agent, or Firm* — The Webb Law Firm

(57) ABSTRACT

A jaw of a jaw set used for demolition, recycling, or material processing equipment with indexable and interchangeable cutting blades that abut with one another to form an apex angle. A jaw set with such a jaw is also included.

11 Claims, 9 Drawing Sheets

155B
155A 140
145
L3
150
B
155A
127
135
130
160A 160A
160B

SHEAR JAW APEX BLADES

BACKGROUND OF THE INVENTION

Field of the Invention

The present invention relates to a jaw set for demolition, recycling, and/or material processing equipment. More particularly, the present invention relates to indexable blades in the jaw set and the apex angles they are able to form.

Description of Related Art

The present application refers to a jaw set for use with demolition equipment, however, the equipment is also referred to as construction equipment, scrap handling equipment and the like. The description of demolition equipment or construction equipment is not intended to be restrictive of the equipment being referenced. Demolition equipment, such as heavy-duty metal cutting shears, have been mounted on excavators and other construction equipment powered by hydraulic cylinders for a variety of jobs in the demolition field. This equipment provides for the efficient cutting and handling of scrap. For example, in the dismantling of an industrial building, metal scrap in the form of various diameter pipes, structural I-beams, channels, angles, sheet metal plates and the like, must be efficiently severed and handled by heavy-duty metal shears.

United States Patent Application Publication No. 2022/0297207 and United States Patent Application Publication No. 2015/0225925 are each directed to a demolition shear having trapezoidal shaped cutting blades which form an apex angle.

SUMMARY OF THE INVENTION

A jaw of a jaw set used for demolition, recycling, or material processing equipment, wherein the jaw is adapted for relative rotation with another jaw. The jaw is comprised of a jaw body having a tip spaced from a pivot for piercing material. A shear region is defined between the pivot and the tip. Within the shear region is a front segment proximate to the pivot. A front blade is mounted in the front segment and has a front blade longitudinal axis. Also within the shear region is a rear segment within the shear region proximate to the tip. A rear blade is mounted in the rear segment and has a rear blade longitudinal axis. The front blade longitudinal axis and the rear blade longitudinal axis intersect to form an apex angle of between 100 degrees and 130 degrees. Each blade has a first end, wherein the first end is made up of an end wall that is perpendicular to the blade longitudinal axis. Each blade also has a second end opposite to the first end, wherein the second end is made up of two surfaces, each of which form an equal acute angle with the blade longitudinal axis and intersect with one another along the blade longitudinal axis to form an arrow shape. Each blade also has cutting edges between the first end and second end. The front blade and the rear blade abut with one another at surfaces on their second ends.

Another embodiment is directed to a jaw set used for demolition, recycling, or material processing equipment. The jaw set has a first jaw which is movable about a pivot pin in the jaw set and a second jaw opposing the first jaw to allow relative rotation between the first jaw and second jaw. The first jaw is comprised of a jaw body having a tip spaced from the pivot for piercing material. A shear region is defined between the pivot and the tip and has a front segment within the shear region proximate to the pivot and a front blade mounted in the front segment having a front blade longitudinal axis. The shear region also has a rear segment within the shear region proximate to the tip with a rear blade mounted in the rear segment having a rear blade longitudinal axis. The front blade longitudinal axis and the rear blade longitudinal axis intersect to form an apex angle of between 100 degrees and 130 degrees. Each blade has a first end, wherein the first end is made up of an end wall that is perpendicular to the blade longitudinal axis. Each blade also has a second end opposite to the first end, wherein the second end is made up of two surfaces, each of which form an obtuse angle with one another and intersect with one another along the blade longitudinal axis to form an arrow shape. Each blade also has cutting edges between the first end and second end. The front blade and the rear blade abut with one another at surfaces on their second ends. The second jaw has blades with cutting edges to act in opposition to the shear region of the first jaw.

Yet another embodiment is directed to a blade for use with a jaw set for demolition, recycling, or material processing equipment. The blade comprises a blade longitudinal axis and a first end, where the first end is made up of an end wall that is perpendicular to the blade longitudinal axis. The blade also has a second end opposite to the first end, wherein the second end is made up of two surfaces, each of which are angled to form an equal acute angle with the blade longitudinal axis and intersect with one another along the blade longitudinal axis to form an arrow shape. The blade also has cutting edges between the first end and second end.

DESCRIPTION OF THE PREFERRED EMBODIMENTS

Figure 1:
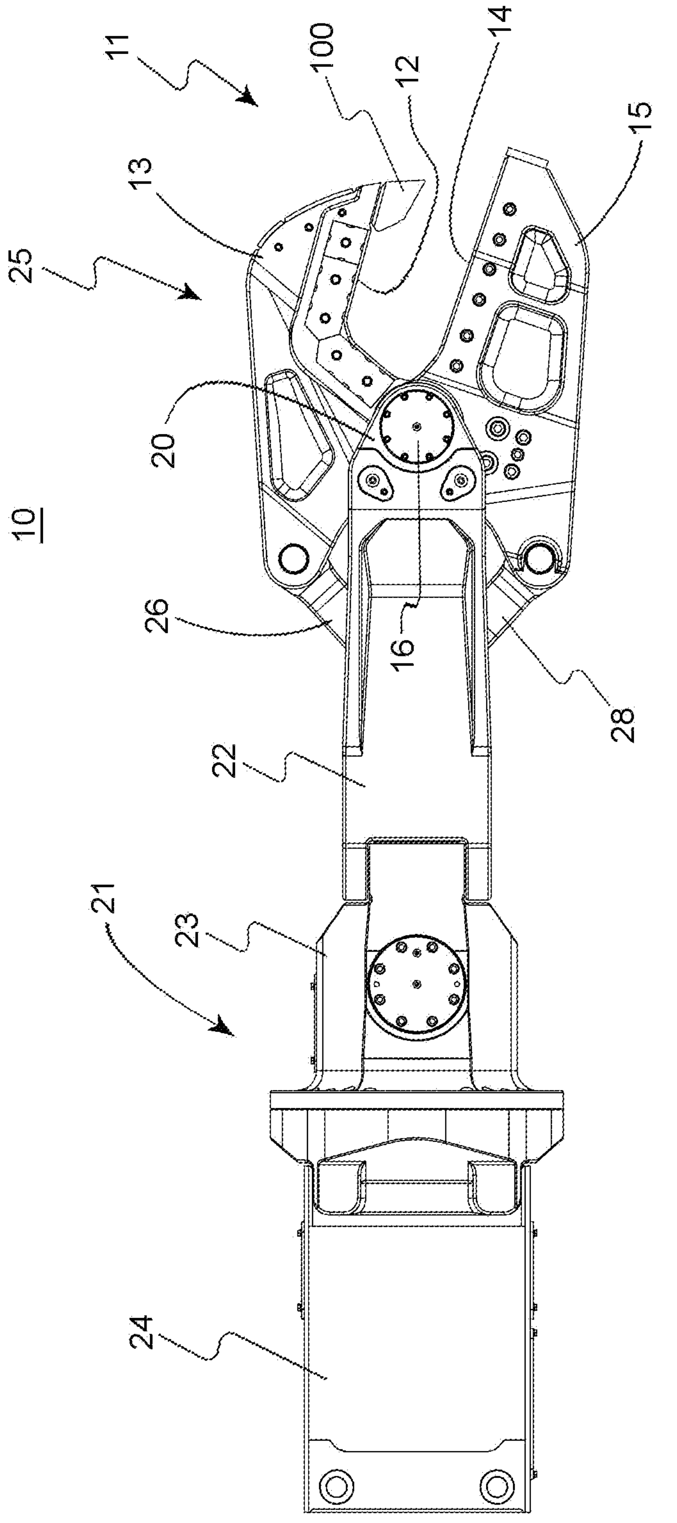
FIG. 1 is a side view of a demolition tool with jaw set in accordance with the subject invention.
Figure 2:
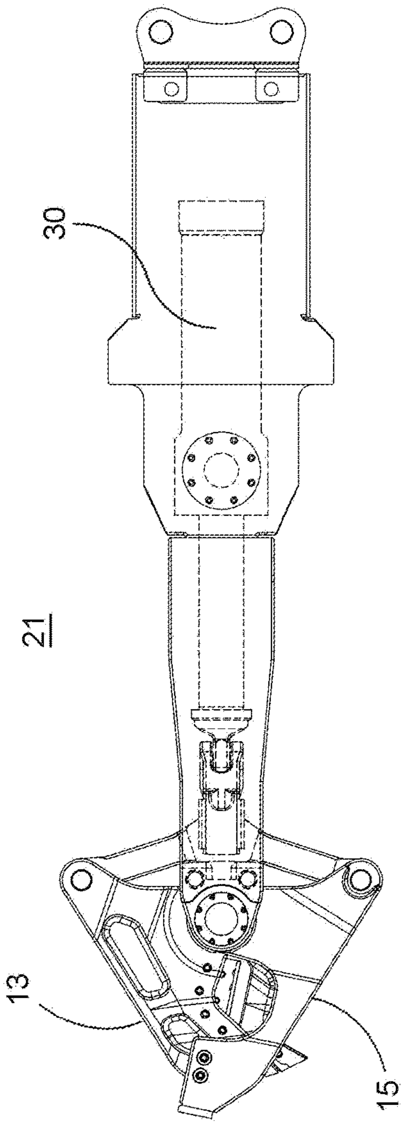
FIG. 2 is a side view of the demolition tool in FIG. 1 with phantom lines showing a hydraulic cylinder capable of pivoting both jaws.

FIG. 1 illustrates a universal tool 10 with a jaw set 11 adapted to be attached to demolition or construction equipment, such as an excavator (not shown). The tool 10 is adapted to connect one of a series of jaw sets 11 to the demolition equipment. As illustrated, the tool 10 in FIG. 1 is a metal shear. The shear 10 includes a first blade set 12 connected to an first jaw 13 and a second blade set 14 connected to a second jaw 15, wherein the first jaw 13 and second jaw 15 are pivotally connected at a hub or main pin 16. A bridge housing 20 is connected to a universal body 21. The body 21 is referred to as universal because it remains common to a series of jaw sets 11 in the attachment system. The universal body 21 may be comprised of sides 22, a bearing housing 23, and a yoke 24. The first jaw 13 and the second jaw 15 may each be connected to a linkage 26, 28 and each linkage 26, 28 may also be attached to at least one hydraulic cylinder 30 (FIG. 2). The first jaw 13 is comprised of a jaw body 25 having a tip 100 spaced from the main pin 16, or pivot for piercing material.

Figure 3:
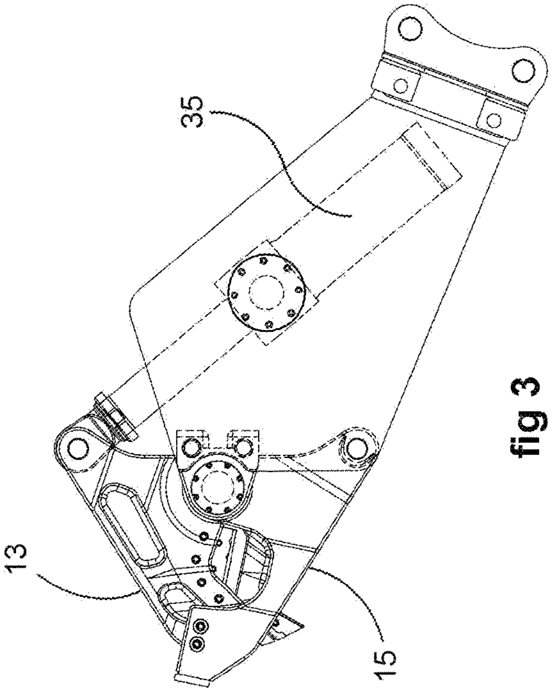
FIG. 3 is a side view of a demolition tool with one fixed jaw and a movable jaw with phantom lines showing a hydraulic cylinder capable of moving a single jaw.

As shown in FIG. 3, it is possible for one jaw 13 to rotate and the other jaw 15 to be fixed such that the hydraulic cylinder 35 drives only one jaw 13 to provide relative rotation between the jaws 13, 15. It is possible to space the first jaw 13 from the second jaw 15 so that each has its own pivot pin. It is also possible to fix the second jaw 15 so that only the first jaw 13 rotates. In all of these arrangements, the first jaw 13 is secured to a pivot pin and adapted to allow relative rotation between the first jaw 13 and the second jaw 15.

Figure 4:
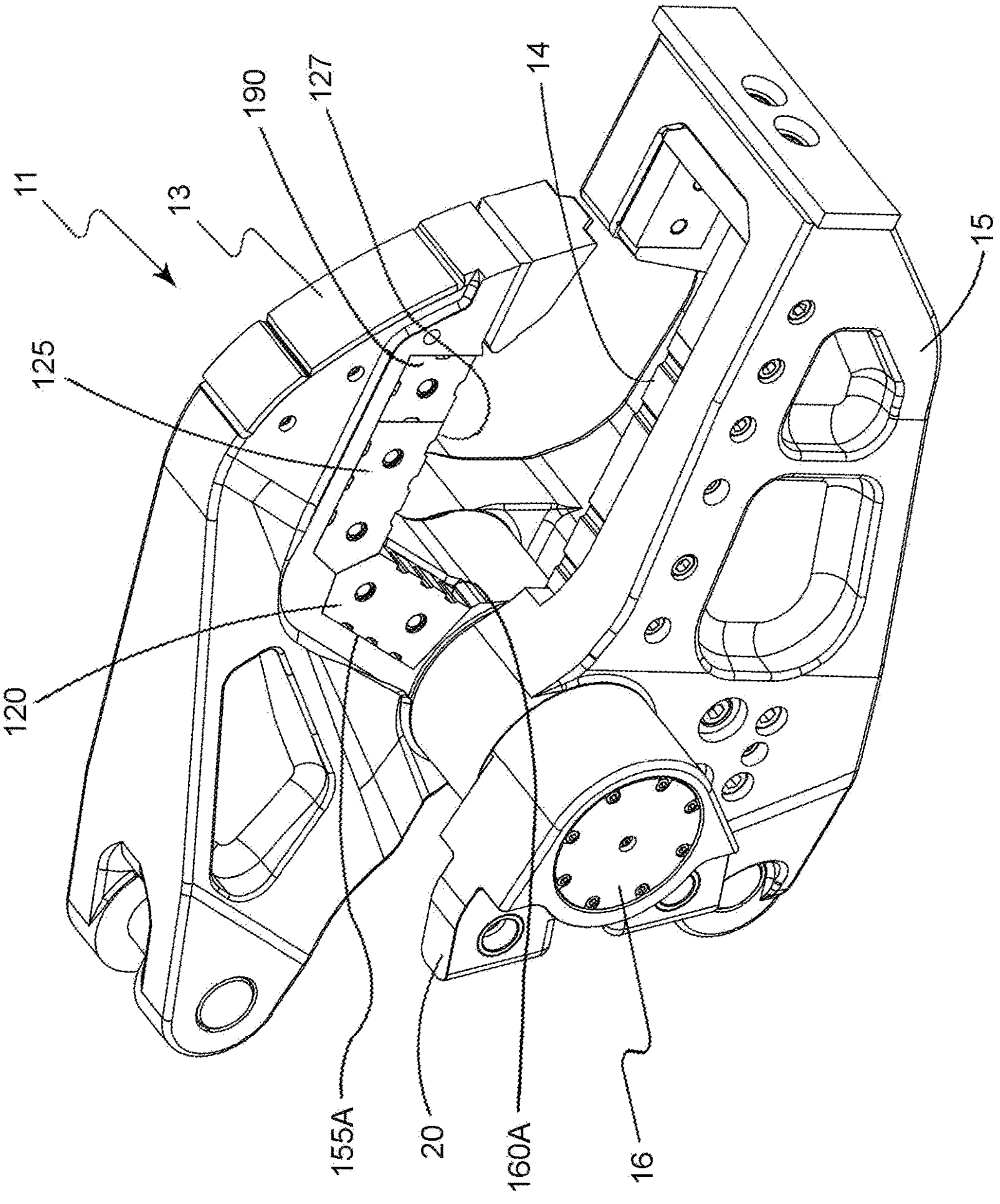
FIG. 4 is a perspective view of the top jaw of the jaw set in FIG. 1.
Figure 5:
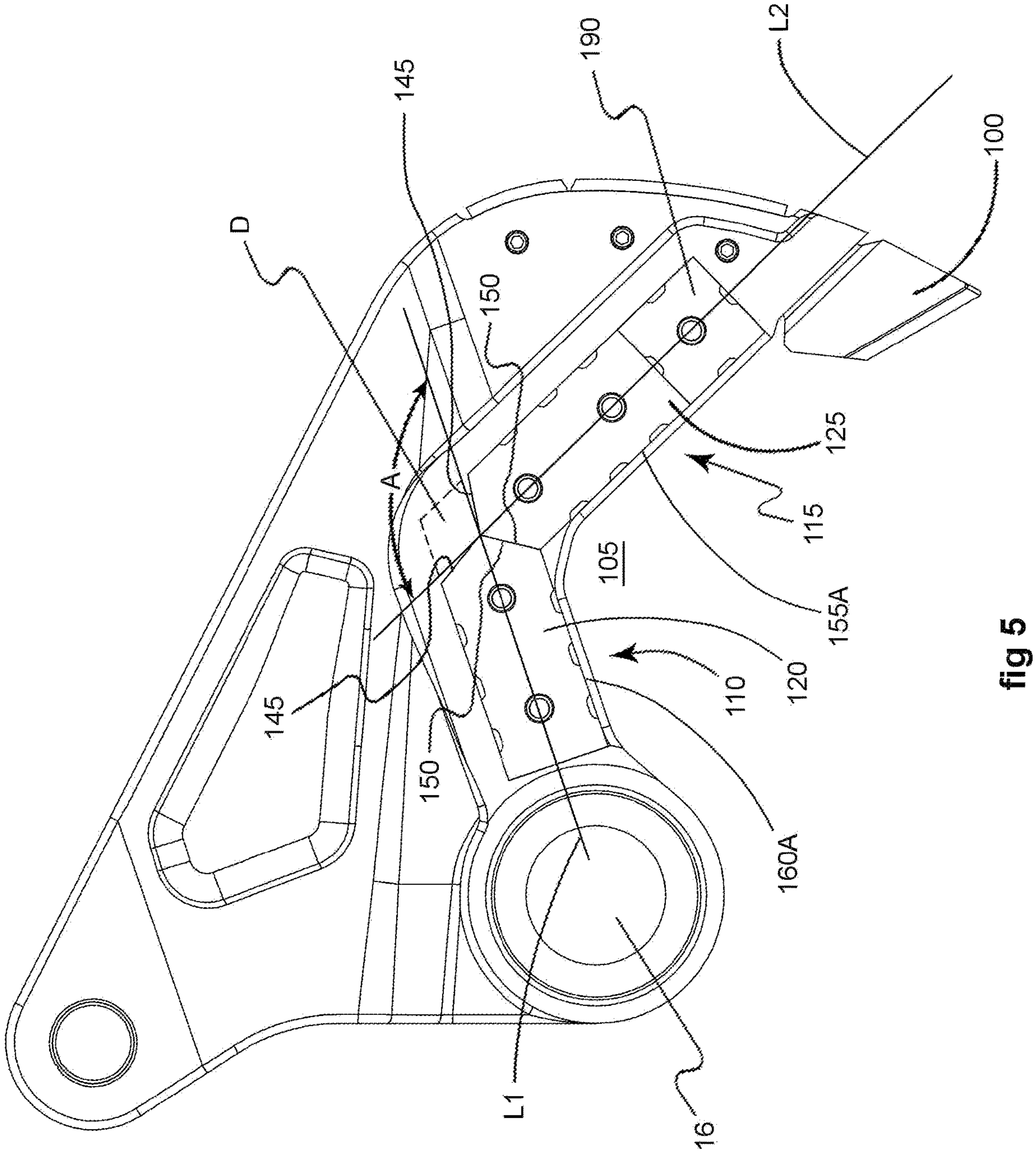
FIG. 5 is a side view of one jaw of the jaw set.

Directing attention to FIGS. 4 and 5, a shear region 105 is defined between the pivot 16 and the tip 100. The shear region 105 has a front segment 110 within the shear region 105 proximate to the pivot 16 and a rear segment 115 within the shear region 105 proximate to the tip 100. A front blade 120 is mounted in the front segment 110 having a front blade longitudinal axis L1. A rear blade 125 is mounted in the rear segment 115 having a rear blade longitudinal axis L2.

The front blade longitudinal axis L1 and the rear blade longitudinal axis L2 intersect to form an apex angle A of between 100° and 130°.

Figure 8:
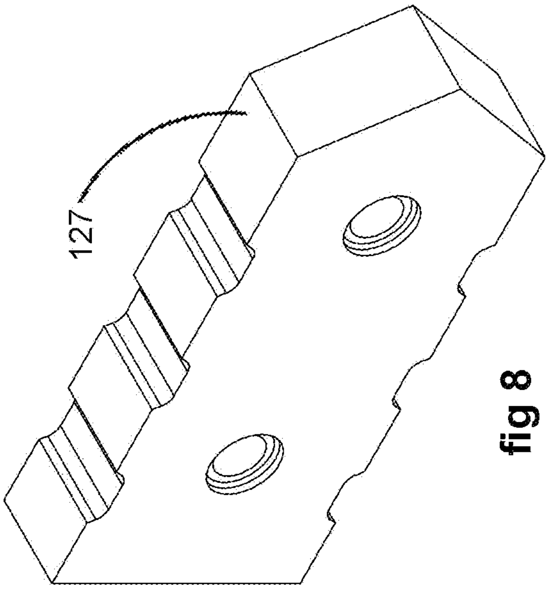
FIGS. 7 and 8 are perspective views of a blade in accordance with the subject invention.

Illustrated in FIGS. 6A-6F is a single blade 127 representative of blades 120, 125 will be discussed. The single blade 127 has a first end 130 made up of an end wall 135 that is perpendicular to the blade longitudinal axis L3. The blade 127 also has a second end 140 opposite to the first end 130. The second end 140 is made up of two surfaces 145, 150 each of which intersect at the longitudinal axis L3 to form with one another obtuse angle B. The two surfaces also intersect with one another to form an arrow shape about the longitudinal axis L3. It should be noted that when two blades 120, 125 (FIG. 5) are positioned relative to one another with their second ends 140 abutting, as shown with blades 120, 125 in FIG. 5, the apex angle A formed by the intersection of the longitudinal axes L1, L2 will be identical to the angle B formed by the intersection of the two surfaces 145, 150 of the single blade 127. FIGS. 7 and 8 show different perspective views of this blade 127.

Again directing attention to FIGS. 6A-6F, when the front blade 120 and the rear blade 125, represented by the single blade 127, are identical in length, then the single blade 127 may be indexed to provide four separate cutting edges 155A, 155B, 160A, or 160B. In particular, the single blade 127 may be indexed such that one of cutting edges 155A, 155B, 160A, or 160B may be used. As an example, directing attention for FIG. 5, and taking the liberty to identify cutting edges 155A, 155B, 160A, or 160B from the single blade 127, in the front blade 120 cutting edge 160A is positioned for cutting, while in the rear blade 125, cutting edge 155A is positioned for cutting. These same blades 120, 125 may now be removed, indexed about their longitudinal axes L1, L2 and reinstalled to expose other cutting edges. In particular, the blade that was used as the front blade 120 may be reinstalled such that cutting edge 155B is exposed and the blade that was used as the rear blade 125 may be reinstalled such that cutting edge 160B is exposed. Furthermore, these same blades may be removed, indexed about an axis perpendicular to each longitudinal axis L3 and reinstalled to provide two additional cutting edges. Overall, when the blades 120, 125 are of equal length, each has four useable cutting edges that may be used in this apex configuration.

Figures 6A, 6B, 6C, 6D, 6E:
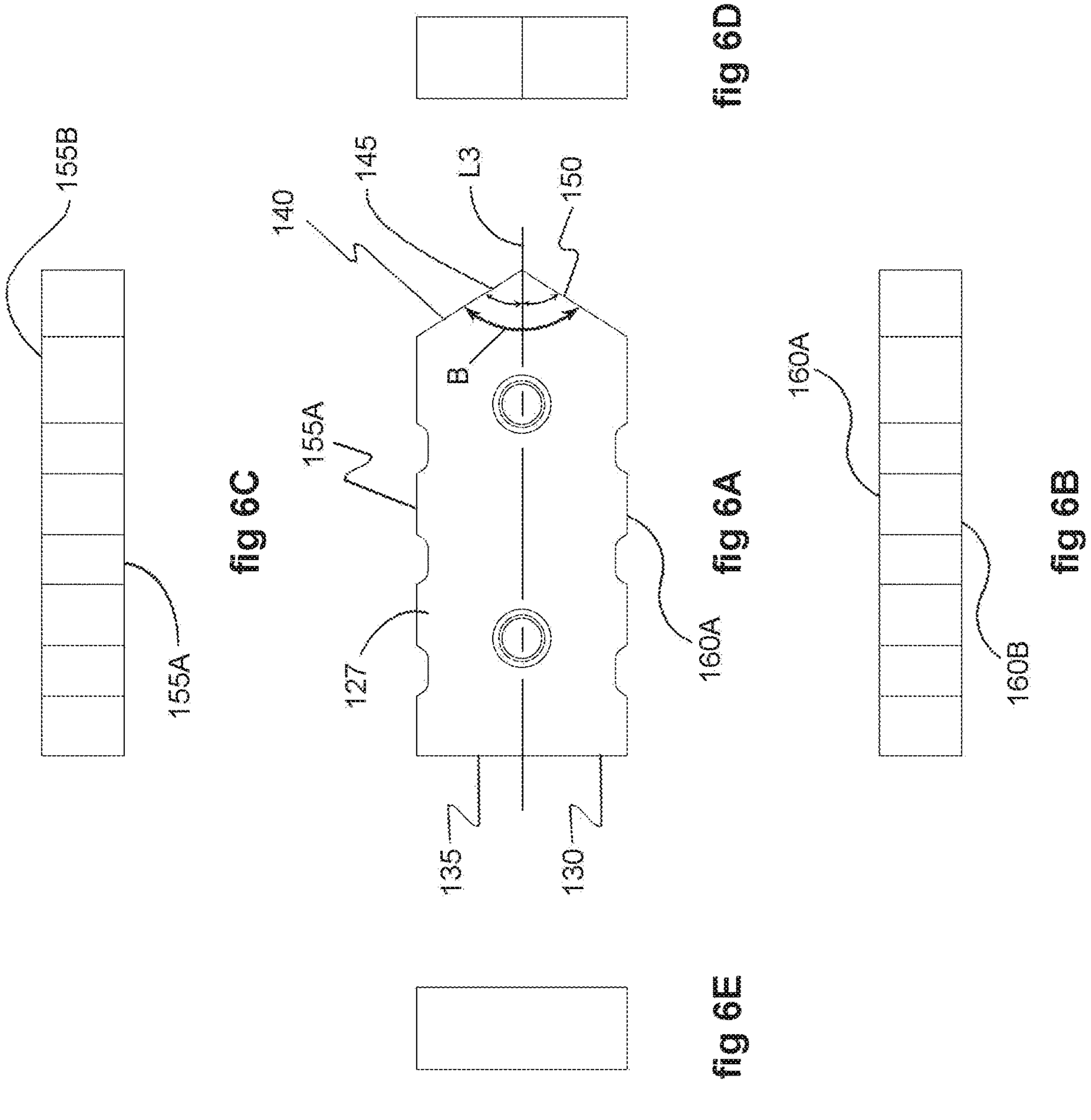
FIGS. 6A-6F are the front view, bottom view, top view, right end view, left end view, and rear view respectively, of a blade used in a jaw in accordance with the subject invention.
Figure 6F:
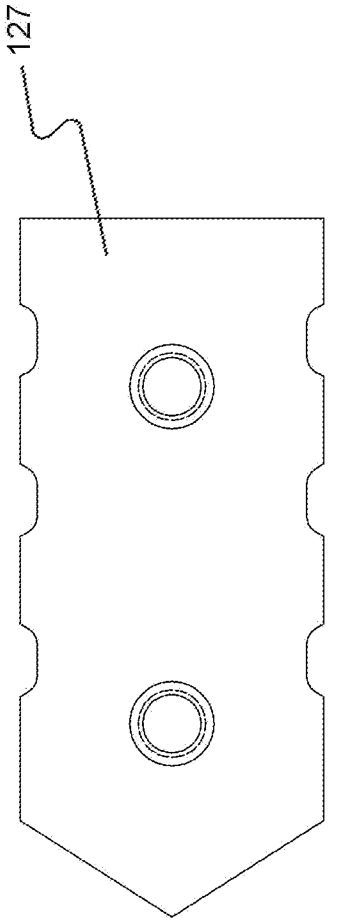
Figure 7:
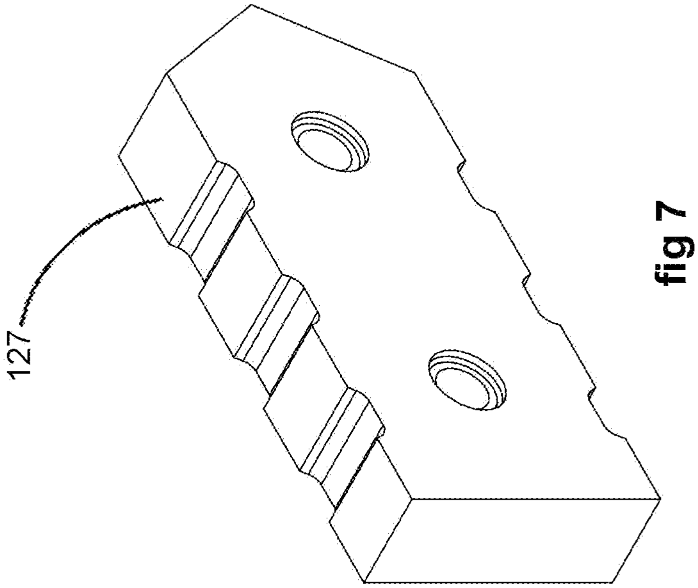

As shown in FIGS. 6D and 6E, a cross-section of the blade 127 perpendicular to the blade longitudinal axis L3 may be rectangular.

An advantage of this blade 127 is the configuration of the second end 140. The arrow shape formed by the surfaces 145, 150 of the second end 140 allows for the first jaw 13 to be more robust. In particular, prior blade designs did not introduce such an arrow shape and contacted one another along the entire length the second end. This could be envisioned by modifying the blade 127 such that the top edges in FIG. 5 intersect with one another as illustrated by the phantom lines in FIG. 5. With such a design, the jaw material in the region D would be removed. This is a region of significant mechanical stress during operation and removal of this material weaken the jaw. By utilizing the blades 125, 127 in accordance with the subject invention, the material in region D that would normally be removed is now retained thereby retaining more material in the jaw and making the jaw stronger.

As illustrated in FIGS. 5 and 6A-6F, one surface 150 of the front end 130 of the front blade 120 abuts with one surface 150 of the first end 130 of the rear blade 125 to form the apex angle A. The front blade 120 and the rear blade 125 may be identical, including the same length. However, they may also have similar shapes, i.e. that same apex angle, but may have different lengths. Regardless of whether or not the blades are of the same length, this apex feature will be applicable.

Figure 9:
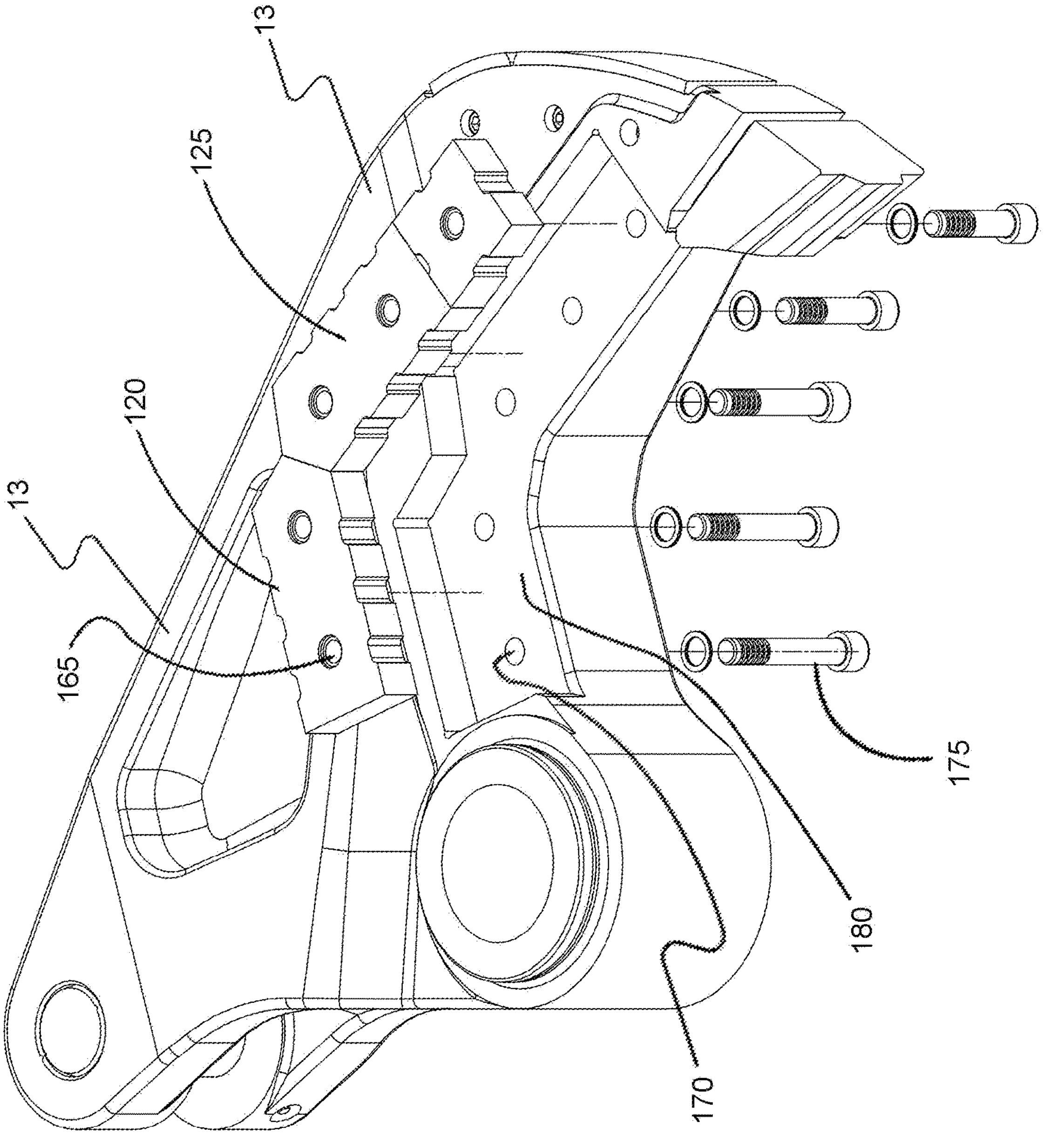
FIG. 9 is an exploded perspective view of a jaw in accordance with the subject invention.

FIG. 9 illustrates the manner by which the front blade 120 and the rear blade 125 are mounted upon the jaw 13. In particular, the blade 120 has at least one bore 165 and the jaw 13 has a matching bore 170 through which at least one bolt 175 is secured. In one embodiment, the bore 165 of the blade 120 and the bolt 175 may be threaded such that the bolt 175 secures the blade 120 within the pocket 180 of the jaw 13.

Again with attention directed to FIG. 9, the rear blade 125 is secured in a fashion similar to that of front blade 120.

As illustrated in FIGS. 2 and 5, the jaw 13 may further include an additional blade 190 adjacent to the end wall 135 of the first end 130 of the rear blade 125. This additional blade 190 may have a square shape.

As seen in FIGS. 2 and 5, the blades of the second blade set 14 of the jaw 15 lie along a straight line. However, depending upon the application, these blades may also define a shape that is not a straight line.

The subject invention may also be directed to a jaw set 11 for demolition, recycling, and material processing equipment wherein the jaw set 11 has a first jaw 13 which is movable about a pivot 16 in the jaw set 11. A second jaw 15 opposes the first jaw 13 to allow relative rotation between the first jaw 13 and the second jaw 15. The details of the first jaw 13 are similar to those already described.

Figure 10A:
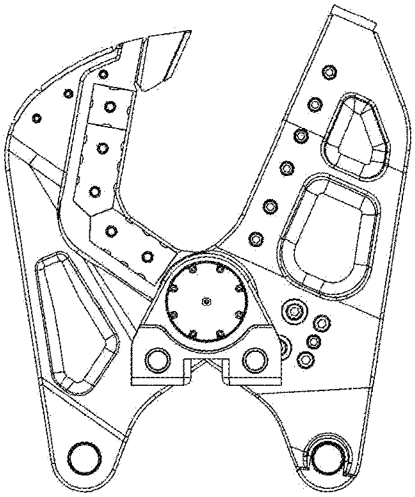
FIGS. 10A-10D are side views of the jaw set showing the progression during a shearing operation.
Figure 10B:
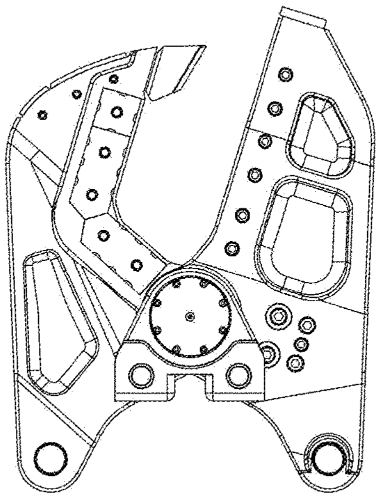
Figure 10C:
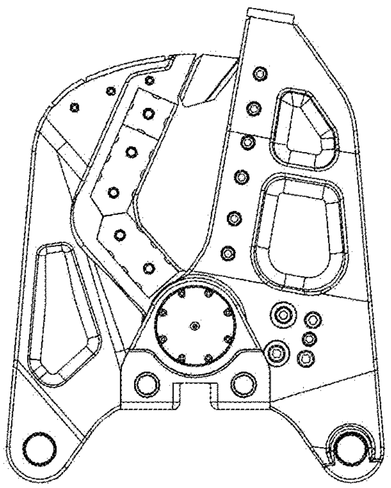
Figure 10D:
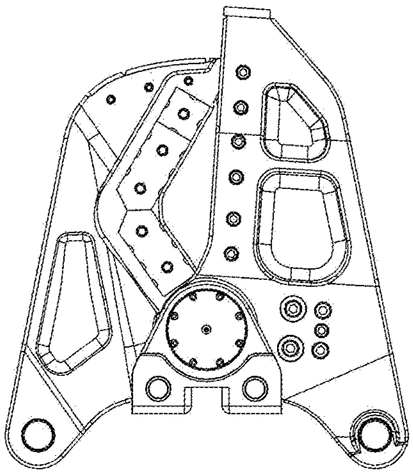
Figure 11B:
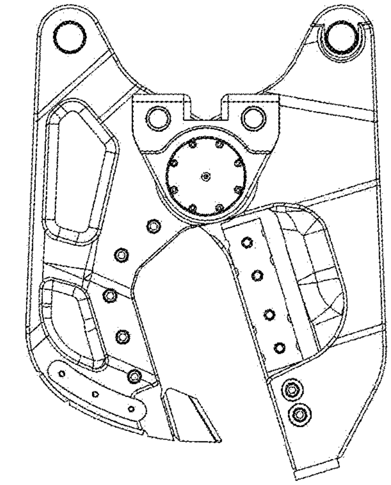
FIGS. 11A-11D are side views of the other side of the jaw set shown in FIGS. 10A-10D.
Figure 11D:
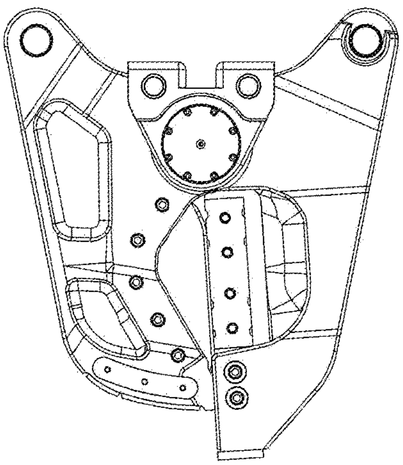
Figure 11A:
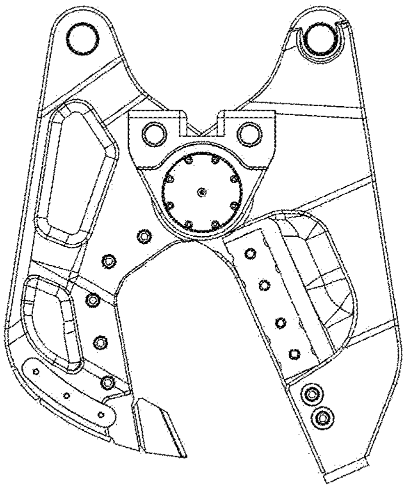
Figure 11C:
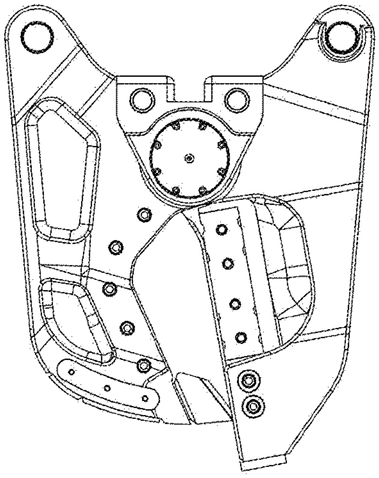

FIGS. 10A-10D show a view of the jaw set 11 similar to that shown in FIG. 1 but illustrating the jaw progression from fully open in FIG. 10A to fully closed in FIG. 10D. FIGS. 11A-11D show a view similar to FIGS. 10A-10D but from the opposite side of the jaw set 11.

The subject invention is further directed to the single blade 127 itself as illustrated in FIGS. 6A-6F. As previously described, the single blade 127 is for use of the jaw set 11 for demolition, recycling, and material processing equipment.

The present embodiments are merely intended to be illustrative of the present invention and not restrictive thereof. It would be apparent to those of ordinary skill in the art that various modifications may be made to the present invention without departing from the spirit and scope thereof.

The invention claimed is:

1. A jaw of a jaw set for demolition, recycling, or material processing equipment, wherein the jaw is adapted for relative rotation with another jaw about a pivot and is comprised of a jaw body having:

a) a tip spaced from the pivot for piercing material; wherein a shear region is defined between the pivot and the tip and has:

b) a front segment within the shear region proximate to the pivot;

c) a front blade mounted in the front segment having a front blade longitudinal axis;

d) a rear segment within the shear region proximate to the tip;

e) a rear blade mounted in the rear segment having a rear blade longitudinal axis;

f) wherein the front blade longitudinal axis and the rear blade longitudinal axis intersect to form an apex angle of between 100 degrees and 130 degrees;

g) wherein each blade has:

1) a first end, where the first end is made up of an end wall that is perpendicular to the blade longitudinal axis;

2) a second end opposite to the first end, wherein the second end is made up of two surfaces, wherein a first surface of the two surfaces forms a first acute angle with the blade longitudinal axis and a second surface of the two surfaces forms a second acute angle with the blade longitudinal axis and the first acute angle and the second acute angle are equal, wherein the two surfaces form an obtuse angle with each other, and wherein the two surfaces intersect with one another along the blade longitudinal axis to form an arrow shape; and 3) cutting edges between the first end and second end;

h) wherein the front blade and the rear blade abut with one another at surfaces on their second ends; and i) wherein the obtuse angle formed by the two surfaces of the second end of the blade is identical to the apex angle formed by the front blade longitudinal axis and the rear blade longitudinal axis.

2. The jaw according to claim 1, wherein each blade is indexable and interchangeable to provide four distinct cutting surfaces.

3. The jaw according to claim 1, further including an additional blade adjacent to the end wall of the first end of the rear blade.

4. The jaw according to claim 3, wherein the additional blade has a square shape.

5. The jaw according to claim 1, wherein a cross-section of the blade perpendicular to the blade longitudinal axis is rectangular.

6. The jaw according to claim 1, further including at least one bore extending through the blade configured to accept bolts to secure the blade to the jaw.

7. The jaw according to claim 1, wherein there are recesses along a length of the cutting edges.

8. A jaw set-used for demolition, recycling, or material processing equipment, wherein the jaw set has:

a) a first jaw which is movable about a pivot pin in the jaw set;

b) a second jaw opposing the first jaw to allow relative rotation between the first jaw and second jaw;

c) wherein the first jaw is comprised of a jaw body having:

1) a tip spaced from the pivot for piercing material; wherein a shear region is defined between the pivot and the tip and has:

2) a front segment within the shear region proximate to the pivot;

3) a front blade mounted in the front segment having a front blade longitudinal axis;

4) rear segment within the shear region proximate to the tip;

5) a rear blade mounted in the rear segment having a rear blade longitudinal axis;

6) wherein the front blade longitudinal axis and the rear blade longitudinal axis intersect to form an apex angle of between 100 degrees and 130 degrees;

7) wherein each blade has:

i) a first end, where the first end is made up of an end wall that is perpendicular to the blade longitudinal axis;

ii) a second end opposite to the first end, wherein the second end is made up of two surfaces, wherein a first surface of the two surfaces forms a first acute angle with the blade longitudinal axis and a second surface of the two surfaces forms a second acute angle with the blade longitudinal axis and the first acute angle and the second acute angle are equal, wherein the two surfaces form an obtuse angle with each other, and wherein the two surfaces intersect with one another along the blade longitudinal axis to form an arrow shape; and iii) cutting edges between the first end and second end;

8) wherein the front blade and the rear blade abut with one another at surfaces on their second ends; and 9) wherein the obtuse angle formed by the two surfaces of the second end of the blade is identical to the apex angle formed by the front blade longitudinal axis and the rear blade longitudinal axis;

d) wherein the second jaw has blades with cutting edges to act in opposition to the shear region of the first jaw.

9. The jaw according to claim 8, wherein each blade is indexable and interchangeable to provide four distinct cutting surfaces.

10. The jaw according to claim 8, further including an additional blade adjacent to the end wall of the first end of the rear blade.

11. The jaw according to claim 10, wherein the additional blade has a square shape.

* * * * *